United States Patent
Tinnakornsrisuphap et al.

(10) Patent No.: US 9,913,229 B2
(45) Date of Patent: Mar. 6, 2018

(54) RANGE TUNING FOR OPEN ACCESS SMALL CELLS

(75) Inventors: Peerapol Tinnakornsrisuphap, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 744 days.

(21) Appl. No.: 13/451,427

(22) Filed: Apr. 19, 2012

(65) Prior Publication Data

US 2013/0109387 A1    May 2, 2013

Related U.S. Application Data

(60) Provisional application No. 61/477,498, filed on Apr. 20, 2011.

(51) Int. Cl.
| | | |
|---|---|---|
| H04W 52/38 | (2009.01) | |
| H04W 16/08 | (2009.01) | |
| H04W 52/32 | (2009.01) | |
| H04W 36/32 | (2009.01) | |
| H04W 52/36 | (2009.01) | |
| H04W 52/40 | (2009.01) | |
| H04W 84/04 | (2009.01) | |

(52) U.S. Cl.
CPC .......... *H04W 52/38* (2013.01); *H04W 16/08* (2013.01); *H04W 52/325* (2013.01); *H04W 36/32* (2013.01); *H04W 52/367* (2013.01); *H04W 52/40* (2013.01); *H04W 84/045* (2013.01)

(58) Field of Classification Search
CPC ... H04W 16/08; H04W 36/32; H04W 52/325; H04W 52/367; H04W 52/38
USPC .................................................... 455/436, 522
See application file for complete search history.

(56) References Cited

U.S. PATENT DOCUMENTS

| 6,141,553 A | * | 10/2000 | Fernandez | ............ H04W 36/24 |
| | | | | 455/436 |
| 7,054,635 B1 | | 5/2006 | Ritzen et al. | |
| 2002/0193135 A1 | | 12/2002 | Nakano | |
| 2005/0130662 A1 | * | 6/2005 | Murai | ........................... 455/444 |
| 2006/0072507 A1 | | 4/2006 | Chandra et al. | |
| 2007/0159301 A1 | | 7/2007 | Hirt et al. | |
| 2009/0275334 A1 | | 11/2009 | Xie et al. | |
| 2010/0040016 A1 | | 2/2010 | Lor et al. | |
| 2011/0096754 A1 | | 4/2011 | Harris et al. | |

(Continued)

FOREIGN PATENT DOCUMENTS

| CN | 101827372 A | 9/2010 |
| EP | 2117250 A1 | 11/2009 |

(Continued)

OTHER PUBLICATIONS

International Search Report and Written Opinion—PCT/US2012/034572—ISA/EPO—dated Jul. 17, 2012.

(Continued)

*Primary Examiner* — Omoniyi Obayanju
(74) *Attorney, Agent, or Firm* — MG-IP Law, P.C

(57) ABSTRACT

Range tuning for open access small cells may be achieved, for example, by determining a likelihood of handoff for a mobile device around a small cell coverage area, and adjusting a range of the small cell coverage area by controlling a transmit power level of the small cell based on the likelihood of handoff.

37 Claims, 5 Drawing Sheets

(56) References Cited

U.S. PATENT DOCUMENTS

| | | | |
|---|---|---|---|
| 2011/0124343 A1 | 5/2011 | Hong et al. | |
| 2012/0100857 A1 | 4/2012 | Belschner et al. | |
| 2013/0122913 A1 | 5/2013 | Agarwal et al. | |
| 2013/0242782 A1* | 9/2013 | Szufarska | H04W 52/243 370/252 |
| 2014/0148213 A1 | 5/2014 | Tinnakornsrisuphap et al. | |

FOREIGN PATENT DOCUMENTS

| | | |
|---|---|---|
| EP | 2387265 A1 | 11/2011 |
| JP | 2010517341 A | 5/2010 |
| JP | 2010518671 A | 5/2010 |
| JP | 2010219970 A | 9/2010 |
| WO | WO-2008089640 A1 | 7/2008 |
| WO | 2008093104 A2 | 8/2008 |
| WO | WO-2010051046 A1 | 5/2010 |
| WO | 2010105558 A1 | 9/2010 |
| WO | WO2011029497 A1 | 3/2011 |

OTHER PUBLICATIONS

Jui-Ming Chen et al: "An adaptive coverage adjustment mechanism for LTE femtocells", Computer Symposium (ICS), 2010 International, IEEE, Piscataway, NJ, USA, Dec. 16, 2010 (Dec. 16, 2010), pp. 824-829, XP03184766.

Sam Yeoul Choi et al: "Adaptive Coverage Adjustment for Femtocell Management in a Residential Scenario", Sep. 23, 2009 (Sep. 23, 2009), Management Enabling the Future Internet for Changing Business and New Computing Services, Springer Berlin Heidelberg, Berlin, Heidelberg, pp. 221-230, XP019131400.

Taiwan Search Report—TW101114223—TIPO—dated Mar. 13, 2014.

Taiwan Search Report—TW101114223—TIPO—dated Oct. 14, 2014.

Zhang H., "A User Mobility Analysis Assistive MRO algorithm for handover parameters optimization in LTE SON system", Wireless Advanced (WIAD), 2012, IEEE, Jun. 25, 2012 (Jun. 25, 2012), pp. 143-148, XP032233122, DOI: 10.1109/WIAD.2012.6296551, ISBN: 978-1-4577-2193-9, p. 144, left-hand column, paragraph 2.

* cited by examiner

RANGE TUNING FOR OPEN ACCESS SMALL CELLS

CLAIM OF PRIORITY UNDER 35 U.S.C. § 119

The present Application for Patent claims priority to Provisional Application No. 61/477,498 entitled "APPARATUS AND METHOD FOR MOBILE ASSISTED RANGE TUNING FOR OPEN ACCESS SMALL CELLS" filed Apr. 20, 2011, and assigned to the assignee hereof and hereby expressly incorporated by reference herein.

FIELD OF DISCLOSURE

This disclosure relates generally to telecommunications, and more particularly to range tuning for open access small cells.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of another telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology.

As the demand for mobile broadband access continues to increase, there exists a need for further improvements in base station coverage. One avenue that is currently under development is the use of smaller cells to extend the coverage area or otherwise work in conjunction with larger, macro cells. However, there remains a need in the art for improved systems and methods relating to small cell deployment.

SUMMARY

Exemplary embodiments of the invention are directed to systems and method for range tuning for open access small cells.

In some embodiments, a method is provided for range tuning for open access small cells. The method may comprise, for example: determining a likelihood of handoff for a mobile device around a small cell coverage area; and adjusting a range of the small cell coverage area by controlling a transmit power level of the small cell based on the likelihood of handoff.

In other embodiments, an apparatus is provided for range tuning for open access small cells. The apparatus may comprise, for example: at least one processor configured to determine a likelihood of handoff for a mobile device around a small cell coverage area, and to adjust a range of the small cell coverage area by controlling a transmit power level of the small cell based on the likelihood of handoff; and memory coupled to the at least one processor and configured to store related data and/or instructions.

In still other embodiments, another apparatus is provided for range tuning for open access small cells. The apparatus may comprise, for example: means for determining a likelihood of handoff for a mobile device around a small cell coverage area; and means for adjusting a range of the small cell coverage area by controlling a transmit power level of the small cell based on the likelihood of handoff.

In still other embodiments, a non-transitory computer-readable medium is provided comprising code, which, when executed by at least one processor, causes the at least one processor to perform operations for range tuning for open access small cells. The non-transitory computer-readable medium may comprise, for example: code for determining a likelihood of handoff for a mobile device around a small cell coverage area; and code for adjusting a range of the small cell coverage area by controlling a transmit power level of the small cell based on the likelihood of handoff.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the present invention are disclosed in the following description and related drawings directed to specific embodiments of the invention. The term "embodiments of the invention" does not require that all embodiments of the invention include the discussed feature, advantage, or mode of operation, and alternate embodiments may be devised without departing from the scope of the invention. Additionally, well-known elements of the invention may not be described in detail or may be omitted so as not to obscure other, more relevant details.

While for purposes of simplicity of explanation, methodologies may be shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). Cdma2000 is described in documents from an organization named "3rd Generation Partnership Project 2" (3GPP2). These various radio technologies and standards are known in the art.

Figure 1:
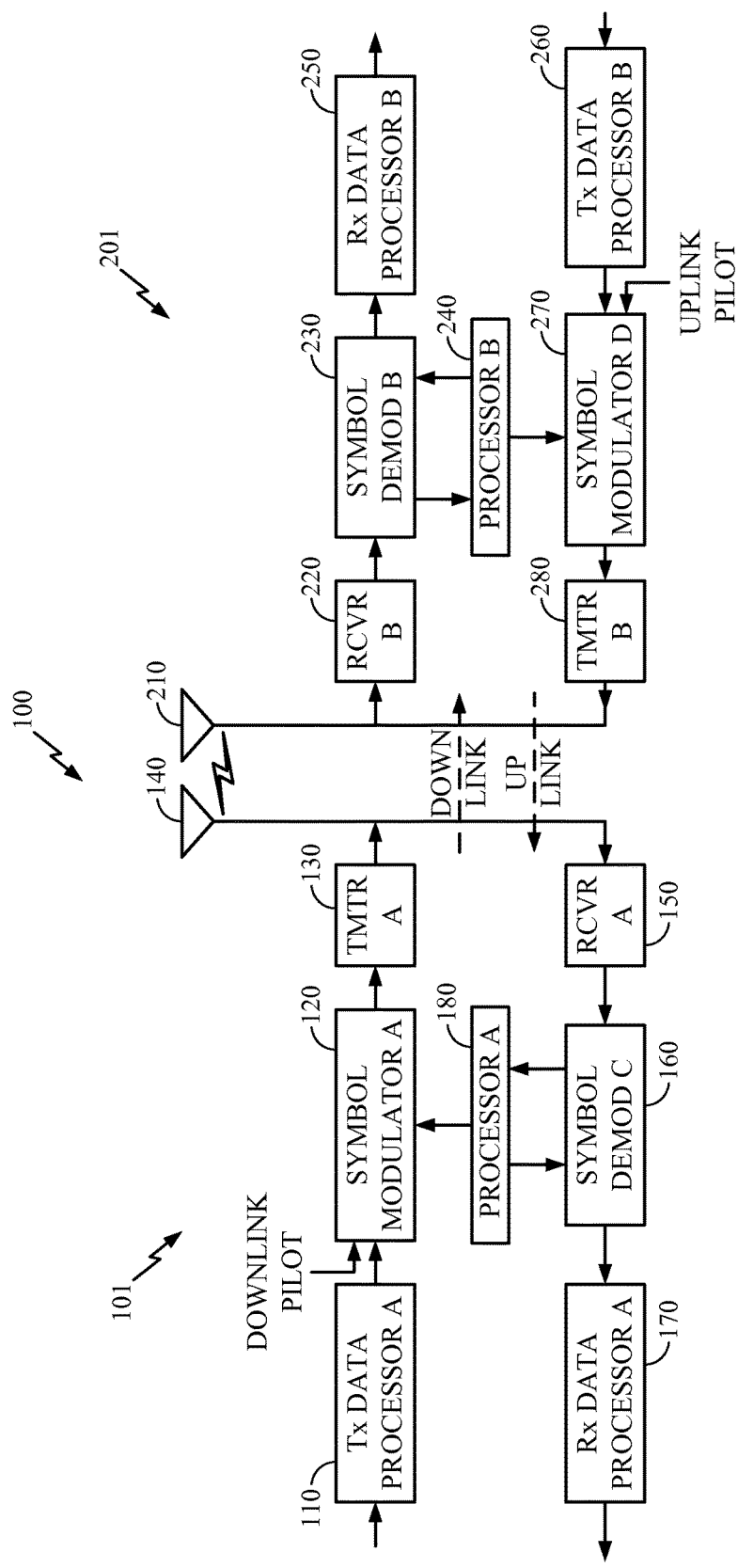
FIG. 1 is a block diagram illustrating an example of a two terminal system, for example, an access node/user equipment system.

FIG. 1 is a block diagram illustrating an example of a two terminal system, for example, an access node/user equipment (UE) system 100. One skilled in the art will understand that the example access node/UE system 100 illustrated in FIG. 1 may be implemented in an FDMA environment, an OFDMA environment, a CDMA environment, a WCDMA environment, a TDMA environment, an SDMA environment or any other suitable wireless environment.

The access node/UE system 100 includes an access node 101 (e.g., base station or NodeB) and a UE 201 (e.g., handset or wireless communication device). In the downlink leg, the access node 101 includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. The symbol modulator A 120 modulates (or symbol maps) traffic data and provides modulation symbols (e.g., data symbols). The symbol modulator A 120 is in communication with processor A 180, which provides configuration information. The symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. The downlink pilot symbols may be, for example, frequency division multiplexed (FDM), orthogonal frequency division multiplexed (OFDM), code division multiplexed (CDM), etc. The transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. The receiver unit B 220 conditions, for example, filters, amplifies, and frequency downconverts the analog downlink signal to produce a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art will understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. Channel estimation involves the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a receive (RX) data processor B 250.

The RX data processor B 250 receives the data symbol estimates on the downlink path from the symbol demodulator B 230 and, for example, demodulates (i.e., symbol demaps), deinterleaves and/or decodes the data symbol estimates on the downlink path to recover the traffic data. The processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. Symbol modulator D 270 is in communication with processor B 240, which provides configuration information. The symbol modulator D 270 is in communication with a transmitter unit (TMTR) B 280.

Each symbol to be transmitted may be a data symbol, an uplink pilot symbol or a signal value of zero. The uplink pilot symbols may be sent continuously in each symbol period. The uplink pilot symbols may be, for example, frequency division multiplexed (FDM), orthogonal frequency division multiplexed (OFDM), code division multiplexed (CDM), etc. The transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit (RCVR) A 150 to obtain samples. The receiver unit A 150 conditions, for example, filters, amplifies and frequency downconverts the analog uplink signal to produce a second "conditioned" signal. The second "conditioned" signal is then sampled. The receiver unit A 150 is in communication with a symbol demodulator C 160. One skilled in the art will understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the UE 201. The symbol demodulator C 160 is also in communication with processor A 180. Processor A 180 performs channel estimation for each active terminal transmitting on the uplink leg. Multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 and at the UE 201, respectively. Either or both processor A 180 and processor B 240 may be associated with one or more memory units (not shown) for storing of program codes and/or data. Either or both processor A 180 or processor B 240 may perform computations to derive frequency and impulse response estimates for the uplink leg and downlink leg, respectively.

In some embodiments, the access node/UE system 100 may be a multiple-access system, such as FDMA, OFDMA, CDMA, TDMA, SDMA, etc. For a multiple-access system, multiple terminals transmit concurrently on the uplink leg, allowing access to a plurality of UEs. The pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
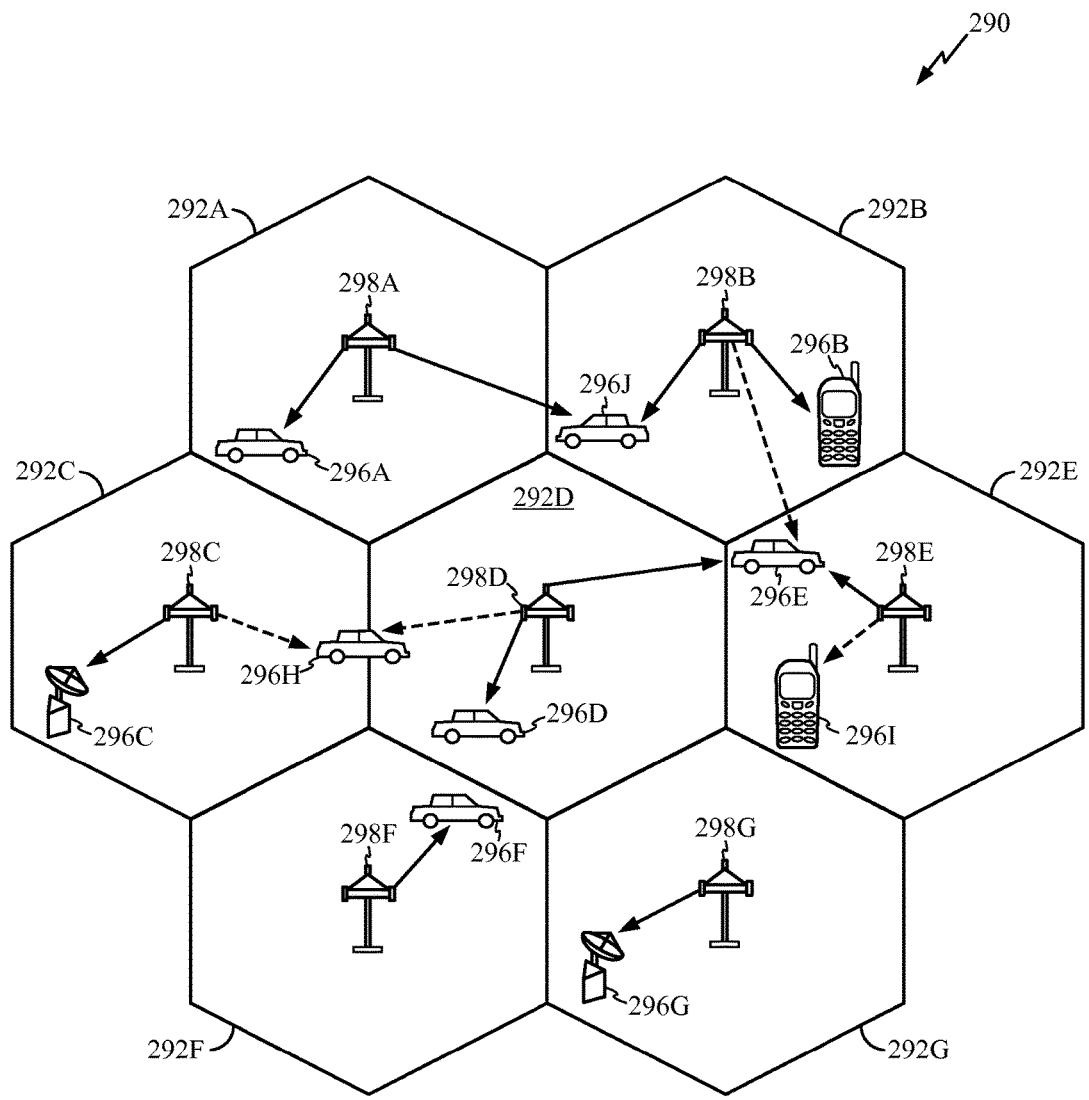
FIG. 2 illustrates an example of a wireless communications system that supports a plurality of user devices.

FIG. 2 illustrates an example of a wireless communications system 290 that supports a plurality of user devices. In FIG. 2, reference numerals 292A to 292G refer to cells, reference numerals 298A to 298G refer to base stations (BS) or NodeBs and reference numerals 296A to 296J refer to access user devices (a.k.a. UEs). Cell size may vary. Any of a variety of algorithms and methods may be used to schedule transmissions in system 290. System 290 provides communication for a number of cells 292A through 292G, each of which is serviced by a corresponding base station 298A through 298G, respectively.

When one of the mobile devices 296A to 296J moves to a different one of the cells 292A to 292G than the one from which it was previously being served, it begins to communicate with a new base station managing that cell (i.e., the corresponding one of the base stations 298A to 298G). This change in serving cell is referred to as a "handoff" (or, equivalently, "handover"). The handoff may be performed while communicating with multiple base stations simultaneously before switching from a current base station to a neighboring base station, which is referred to as "soft handoff." In soft handoff, communication with the neighboring base station may begin before communication with the current base station is terminated. There is a modified version of soft handoff called "softer handoff," where the mobile device simultaneously communicates with a plurality of sectors within the same base station. Alternatively, a "hard handoff" may be performed when the change in serving cell is between two different frequencies or when a base station is not suitably synchronized for soft handoff. In hard handoff, communication with the current base station is terminated before communication with the neighboring base station is established.

As discussed in the background above, smaller cells are starting to be deployed to extend the coverage area or otherwise work in conjunction with larger, macro cells such as those illustrated in FIG. 2. In this way, wireless communication systems may include a mixed plurality of cells to provide coverage for mobile users. In general, a macro cell may be a cell with a nominal radius typically on the order of kilometers, while a small cell may be a cell with a nominal radius typically less than one kilometer. Small cells (e.g., femto cells or pico cells) are often deployed in wireless communication systems as "hotspots" to offload macro cell signaling. A hotspot may provide, for example, public wireless access to the Internet. Small cells are well-suited for serving nomadic mobile devices with relatively low mobility.

Figure 3:
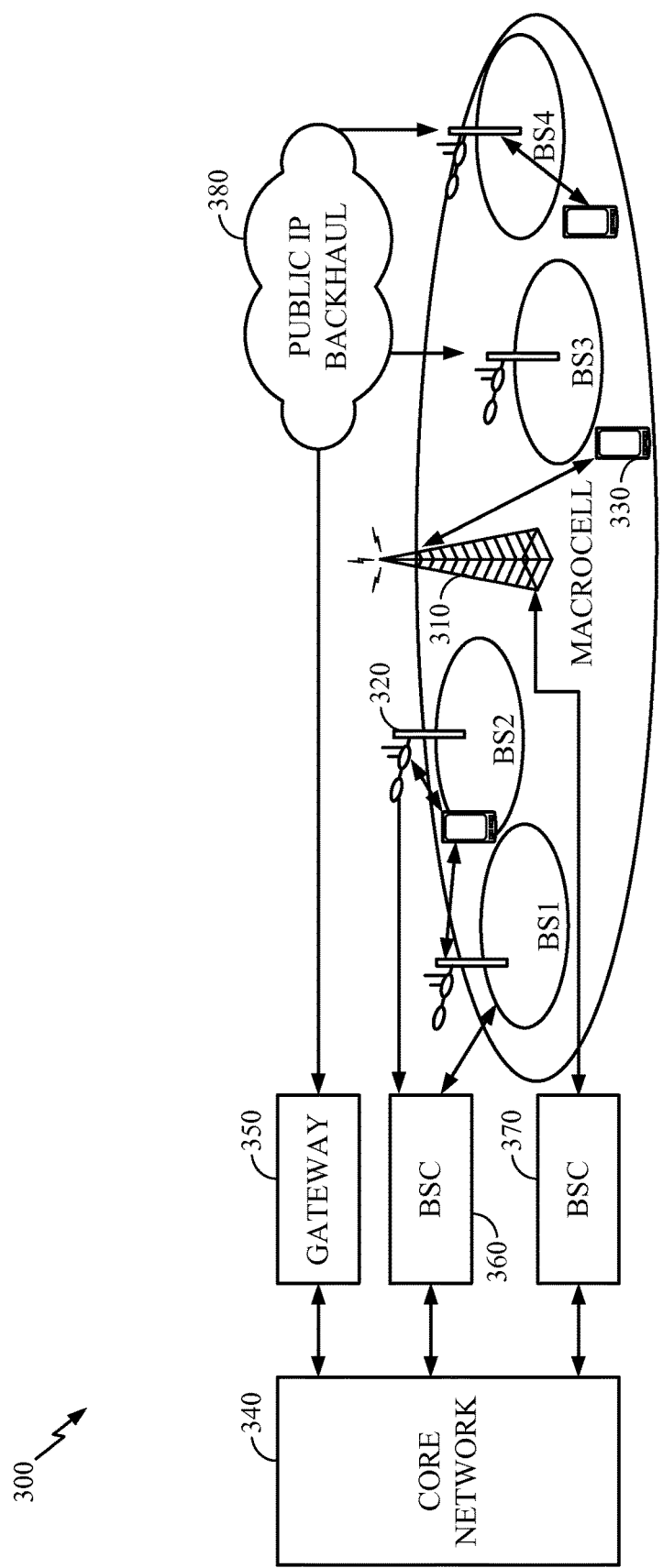
FIG. 3 illustrates an example communication system in which small cells are deployed in concert with macro cells.

FIG. 3 illustrates an example communication system in which small cells are deployed in concert with macro cells. In this example, a network 300 includes a macro cell base station 310 deployed in concert with a plurality of small cell (e.g., femtonode or piconode) base stations 320. The small cell coverage areas may be identified by particular pseudo-random noise sequence offsets (PN offsets), primary scrambling codes (PSCs), or physical cell identifiers (PCIs), which may be reused among all or a portion of the small cell base stations 320. There are several deployment scenarios under which such a mixed-cell network 300 may be advantageous for providing service to a given mobile device 330, including, for example, remote locations (e.g., rural areas where there is limited macro cell coverage), coverage improvement (e.g., suburban areas at a macro cell edge), or capacity improvement (e.g., dense urban areas or hotspots).

As shown, the macro cell base station 310 is typically connected to a core network 340 via a macro cell base station controller (BSC) 360. However, there are several options for connecting the small cell base stations 320 to the core network 330. For example, some small cell base stations 320 may be connected to the core network 330 via a gateway 350 and a public IP backhaul link 380. A dedicated backhaul link may be required if soft handoff is supported for the small cell base stations 320, otherwise a public IP backhaul link may be sufficient. Other small cell base stations 320 may be connected to the core network 330 via a dedicated base station controller (BSC) 370.

The illustrated deployment model for the small cell base stations may be referred to as an open access small cell deployment model. Other models include a shared macro controller used in an outdoor network, and a dedicated controller used in an indoor network. One skilled in the art will appreciate, however, that these example models are not meant to be exhaustive and that other example models may be employed in certain systems.

There are several advantages in an open access small cell deployment model. For example, open selection of vendors is possible since inter-operability is only required at the core network, a simpler deployment is facilitated in remote locations with limited macro network coverage, simpler pseudo-random noise (PN) code assignments and neighbor list configuration, more backhaul options, etc. However, for small cells not controlled by a macro cell BSC, soft handoff may not be supported between small cells and macro cells, and registration may be required for idle transition between small cells and macro cells. In this case, handoff may be limited to hard handoff.

The lack of soft handoff, fast serving cell switching, and interference mitigation among small cells and macro cells in this type of system presents challenges for optimizing small cell performance. This is especially true at edge locations along the coverage boundary, where high velocity mobile devices may cause several problems as they attempt to switch cell coverage, and ongoing connections may be dropped.

Accordingly, apparatuses, methods, and other techniques are described herein for improving range tuning for open access small cells by leveraging mobile device information so as to not attract high velocity mobile devices or other devices with a high likelihood of handoff, while achieving a desired level of coverage. Various embodiments presented herein offer several advantages over conventional designs for improved usage of small cells in a wireless communication environment. The advantages disclosed herein are not exclusive, however, as other advantages may become apparent to one skilled in the art through the present disclosure.

Figure 4:
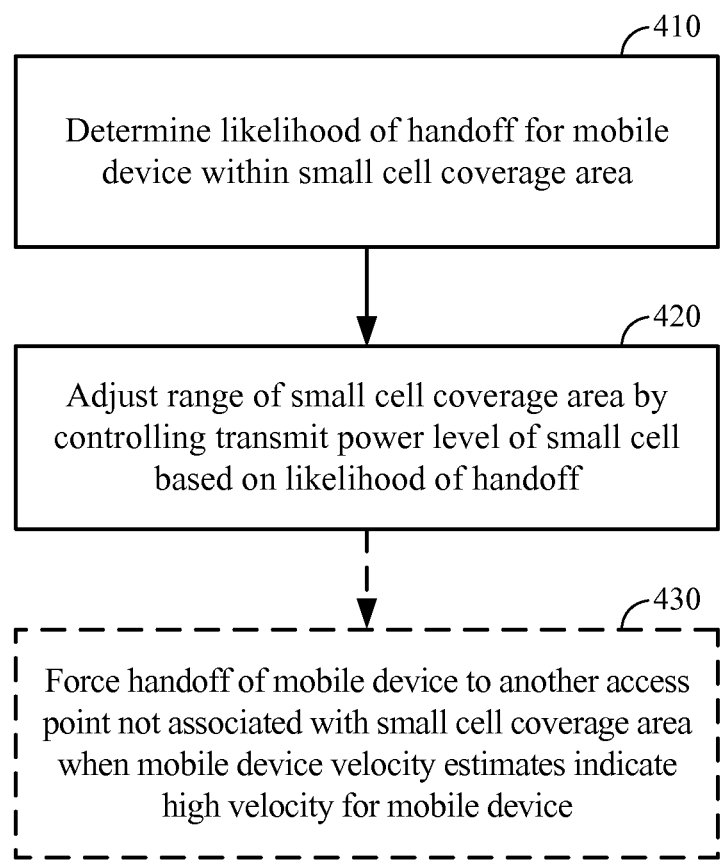
FIG. 4 illustrates an example method of range tuning for open access small cells.

FIG. 4 illustrates an example method of range tuning for open access small cells. As shown, a small cell (e.g., one of the small cell base stations 320 illustrated in FIG. 3) may determine a likelihood of handoff for a mobile device (e.g., the associated or potentially associated mobile devices 330 illustrated in FIG. 3) around its small cell coverage area (block 410), and adjust a range of the small cell coverage area by controlling a transmit power level of the small cell based on the likelihood of handoff (block 420). As discussed above, the small cell coverage area to be adjusted may be identified by a pseudo-random noise sequence offset (PN offset) or primary scrambling code (PSC).

In this way, forward link (FL) or downlink (DL) transmit power, for example, may be calibrated to control the coverage radius of a small cell (e.g., to cover a corresponding hotspot area without attracting high mobility mobile devices). A calibration performed in this manner may avoid unnecessary handoffs and may limit channel element power consumption by excluding a high mobility coverage area, since a large number of high mobility mobile devices may trigger frequent hand-in and immediately hand-out situations. In such cases, handoff procedures may not be able to be performed quickly enough to ensure a successful handoff. Moreover, frequent handoffs generate more signaling load to other network elements.

In some embodiments, the small cell may comprise a femto cell or pico cell base station (e.g., one of the small cell base stations 320 illustrated in FIG. 3) not controlled by a macro cell base station controller (e.g., the macro cell BSC 370). Instead, the small cell may operate independently from the macro cell network, and communicate with a core network (e.g., the core network 340) via either a gateway and backhaul link (e.g., the gateway 350 and the public IP backhaul link 380) or a dedicated BSC (e.g., the dedicated BSC 370). The likelihood of handoff may accordingly correspond to an expected frequency of handoffs from the femto cell or pico cell base station to a macro cell base station controlled by the macro cell base station controller, with such handoffs leading to the associated problems discussed above.

According to various embodiments, the likelihood of handoff may be determined in different ways. For example, in some embodiments, the likelihood of handoff may be determined based on a connection time duration of active mobile devices within the small cell, or, more generally, a history of connection time durations that each mobile spent in previous cells (e.g., from a UE History Information IE in the UTRAN Iu interface). A short duration (e.g., on the order of tens of seconds) may indicate a high likelihood of handoff, and cause the coverage area to be contracted. Conversely, a large duration (e.g., on the order of several minutes) may indicate a low likelihood of handoff, and, in some instances, signal that the coverage area may be safely expanded.

In other embodiments, the likelihood of handoff may be determined based on handoff success/failure statistics. A high failure rate (e.g., greater than about 1%) may indicate that the coverage area should be contracted. Conversely, a high success rate (e.g., greater than about 99.99%) may indicate that the coverage area may be safely expanded.

In still other embodiments, the likelihood of handoff may be determined based on mobile device velocity estimates. High velocity estimates may indicate a high likelihood of handoff, and cause the coverage area to be contracted. Conversely, low velocity estimates may indicate a low likelihood of handoff, and, in some instances, signal that the coverage area may be safely expanded. It will be appreciated that what constitutes a high velocity may depend on the size of the particular coverage area at issue as well as other factors. For example, for a target connection duration of at least one minute and a cell diameter of approximately 100 meters, a speed greater than about 100 meters/minute may be considered a high velocity.

The mobile device velocity estimates may be based at least in part on periodic position reports from the mobile device, periodic velocity reports from the mobile device, Doppler estimates in the mobile device or base station, or a round trip delay measurement for communication with the mobile device, for example. When the mobile device velocity estimates indicate a high velocity for the mobile device, the small cell may, in some instances, force a handoff of the mobile device to another access point not associated with the small cell coverage area (illustrated by optional block 430 in FIG. 4).

In still other embodiments, the likelihood of handoff may be determined based on the number of hand-ins in a given time period or the number of hand-outs in a given time period. A high number of hand-ins or hand-outs in a given time period may indicate a high likelihood of handoff, and cause the coverage area to be contracted. Conversely, a low number of hand-ins or hand-outs in a given time period may indicate a low likelihood of handoff, and, in some instances, signal that the coverage area may be safely expanded. It will again be appreciated that what constitutes a high number of hand-ins or hand-outs may depend on the size of the particular coverage area at issue as well as other factors. For example, if a cell can serve 16 connected users simultaneously and a target connection duration is set to at least one minute, it may be desired that the number of handoffs be less than 16 handoffs per minute, with anything greater constituting a high number of hand-ins/hand-outs.

In addition or as an alternative to the techniques above, the likelihood of handoff may also be determined based on mobile-assisted information provided by the mobile device. Mobile-assisted range tuning for open access small cells may involve several options.

In some embodiments, the likelihood of handoff may be determined based on mobile-assisted information including statistics collected from the mobile device while idle, statistics obtained by paging the mobile device at a time period after registration, or periodic registration information obtained from the mobile device. For example, a small cell may page a mobile device at some time period after registration to see whether the mobile device is still within the small cell coverage area. The page may be performed in conjunction with a duration threshold used to make a decision on whether to decrease the small cell transmit power. In one example, the page may be sent only to a subset of the mobile devices that have registered with the small cell. In other examples, the small cell may configure the mobile device to perform periodic registration, where the period may be determined based on a duration threshold for adjusting the small cell transmit power.

It will be appreciated that two or more of the above methods for determining the likelihood of handoff for a given mobile device may be employed in concert.

When adjusting the range of the small cell coverage area, controlling the transmit power level of the small cell may be constrained by a configurable maximum target limit (Txmax) and a configurable minimum target limit (Txmin) derived from a transmission power or a measured received power of a neighboring macro cell. For example, the open access small cell transmit power may be increased or decreased up to a certain limit determined based on a macro cell pilot strength, where the limit may be determined to meet a target maximum coverage area and a target minimum coverage area (e.g., between about an 80 dB and about a 110 dB pathloss). The adjustment may be event based, for example, such as every time a threshold is crossed, or periodic, where the increase/decrease is based on the aggregate statistics of all events in a given period. In some instances, the increased transmit power may be smaller in magnitude and more infrequent, while the decreased transmit power may be larger in magnitude and more immediate.

One skilled in the art will understand that certain steps disclosed in the example flow diagram in FIG. 4 can be interchanged in their order without departing from the scope and spirit of the present disclosure. Also, one skilled in the art will understand that the steps illustrated in the flow diagram are not exclusive and that other steps may be included or one or more of the steps in the example flow diagram may be deleted without affecting the scope and spirit of the present disclosure.

Methods for improving range tuning for open access small cells by leveraging mobile device information as provided herein may be implemented by a device configured as a communication device or as a processor or similar device for use within the communication device. For example, the device may include functional blocks representing functions implemented by a processor, software, hardware or a combination thereof (e.g., firmware), and may include one or more electrical components for performing the steps illustrated in blocks 410-430.

Figure 5:
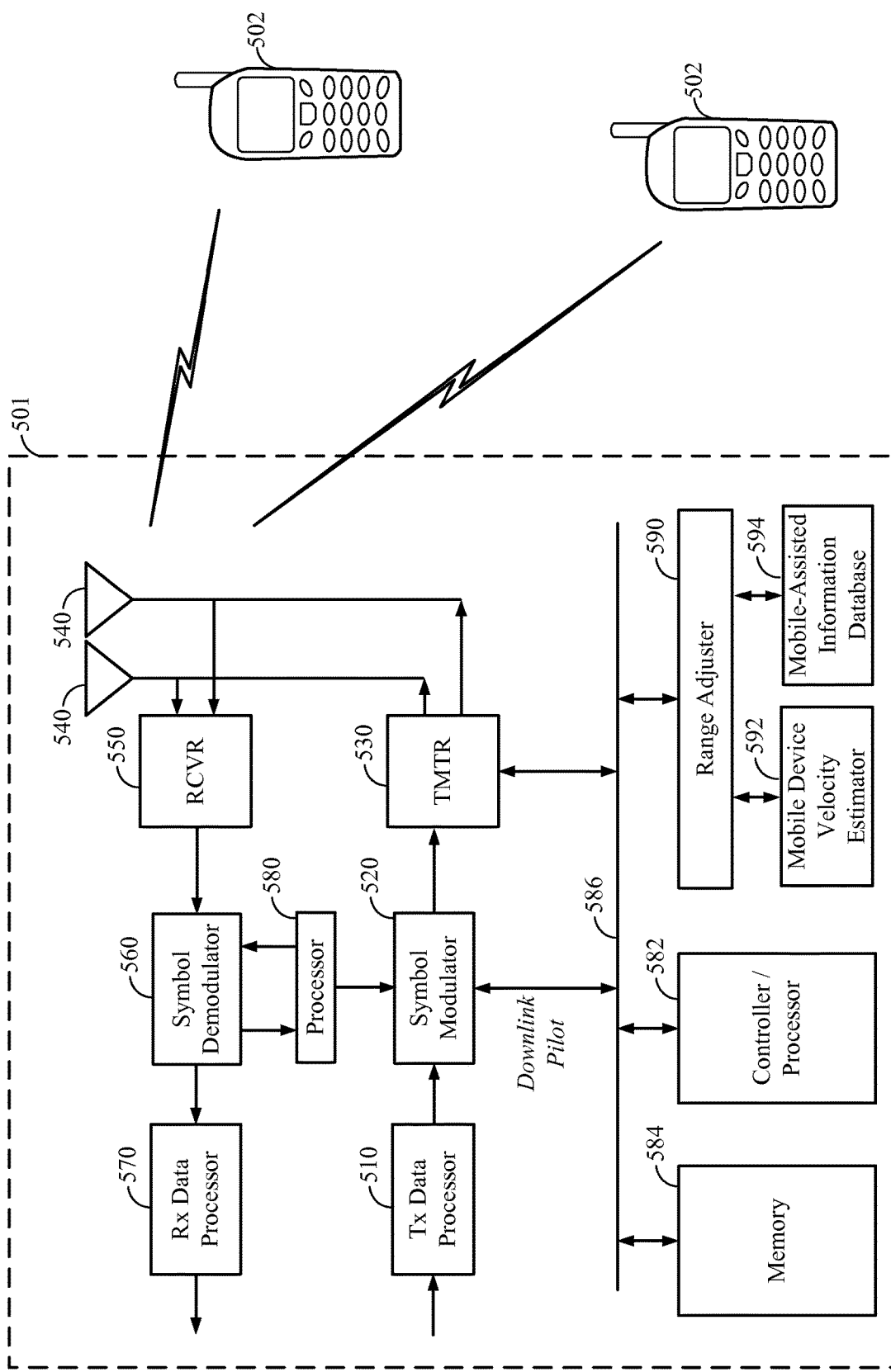
FIG. 5 illustrates an example small cell base station apparatus configured to perform range tuning according to one or more of the embodiments described herein.

FIG. 5 illustrates an example small cell base station apparatus configured to perform range tuning according to one or more of the embodiments described above. As with the access node 101 illustrated in FIG. 1, the small cell base station apparatus 501 includes a corresponding TX data processor 510, symbol modulator 520, transmitter unit (TMTR) 530, antenna(s) 540, receiver unit (RCVR) 550, symbol demodulator 560, RX data processor 570, and configuration information processor 580, performing the operations described above for communicating with one or more mobile devices 502. The small cell base station apparatus 501 may also include one or more general purpose controllers or processors (illustrated in the singular as the controller/processor 582) and memory 584 configured to store related data or instructions. Together, via a bus 586, these units may perform processing in accordance with the appropriate radio technology or technologies used for communication, as well as other functions for the small cell base station apparatus 501.

According to various embodiments, the small cell base station apparatus 501 may further include a range adjustment module 590 for determining a likelihood of handoff for a mobile device around the small cell coverage area and for adjusting a range of the small cell coverage area accordingly, by controlling a transmit power level of the small cell base station apparatus 501 based on the likelihood of handoff. As shown, the range adjustment module 590 may make the determination and adjustment based on information provided by other specially purposed modules, such as the illustrated mobile device velocity estimator 592 and/or the mobile-assisted information database 594. It will be appreciated that, in some designs, the functionality of one or more of the range adjustment module 590, the mobile device velocity estimator 592, or the mobile-assisted information database 594 may be integrated directly into, or otherwise performed by, the general purpose controller/processor 582 of the small cell base station apparatus 501, sometimes in conjunction with the memory 584.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit.

Additionally, the various illustrative flow diagrams, logical blocks, modules and/or algorithm steps described herein may also be coded as computer-readable instructions carried on any computer-readable medium known in the art or implemented in any computer program product known in the art. Computer-readable media include both computer storage media and communication media including any medium that facilitates transfer of a computer program from one place to another. A storage medium may be any available medium that can be accessed by a computer. By way of example, and not limitation, such computer-readable media may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of a medium. Disk and disc, as used herein, include compact disc (CD), laser disc, optical disc, digital versatile disc (DVD), floppy disk and blu-ray disc, where disks usually reproduce data magnetically, and discs reproduce data optically with lasers. Combinations of the above should also be included within the scope of computer-readable media.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method of range tuning for open access small cells, comprising:
   receiving, at a small cell, a communication from a mobile device, the communication including one or more of the following:
      a history of connection time durations of the mobile device with respect to at least one cell that is different from the small cell; and
      a registration associated with the mobile device;
   determining an expected frequency of handoff for the mobile device around a small cell coverage area of the small cell based on the received communication;
   increasing a transmit power level of the small cell in response to a determination that the expected frequency of handoff does not exceed a threshold value;
   decreasing the transmit power level of the small cell in response to a determination that the expected frequency of handoff exceeds the threshold value; and
   transmitting a signal at the increased or decreased transmit power.

2. The method of claim 1, wherein the small cell coverage area is identified by a pseudo-random noise sequence offset (PN offset), primary scrambling code (PSC), or physical cell identifier (PCI).

3. The method of claim 1, wherein the small cell comprises a femto cell or pico cell base station not controlled by a macro cell base station controller.

4. The method of claim 3, wherein the expected frequency of handoff is an expected frequency of handoff from the femto cell or pico cell base station to a macro cell base station controlled by the macro cell base station controller.

5. A method of range tuning for open access small cells, comprising:
   determining, at a small cell, one or more of the following:
      a handoff success/failure rate among one or more mobile devices associated with the small cell; and
      a number of hand-ins and/or hand-outs among the one or more mobile devices associated with the small cell in a given time period;
   determining an expected frequency of handoff for the small cell based on the determining;
   increasing a transmit power level of the small cell in response to a determination that the handoff success/failure rate and/or or the number of hand-ins and/or hand-outs is below a threshold;
   decreasing the transmit power level of the small cell in response to a determination that the handoff success/failure rate and/or or the number of hand-ins and/or hand-outs is above the threshold; and
   transmitting a signal at the increased or decreased transmit power.

6. The method of claim 1, wherein the communication further include a mobile device velocity estimate, the mobile device velocity estimate being based at least in part on one or more position reports from the mobile device, one or more velocity reports from the mobile device, Doppler estimates associated with the mobile device, or a round trip delay measurement for communication with the mobile device.

7. The method of claim 6, further comprising forcing a handoff of the mobile device to another access point when the mobile device velocity estimates indicate a high velocity for the mobile device.

8. The method of claim 1, wherein controlling the transmit power level of the small cell is constrained by a maximum target limit and a minimum target limit derived from a transmission power or a measured received power of a neighboring macro cell.

9. An apparatus for range tuning for open access small cells, comprising:
   at least one transceiver configured to:
      receive, at a small cell, a communication from a mobile device, the communication including one or more of the following:
         a history of connection time durations of the mobile device with respect to at least one cell that is different from the small cell; and
         a registration associated with the mobile device;
   at least one processor configured to:
   determine an expected frequency of handoff for the mobile device with respect to the small cell based on the received communication;
   increase a transmit power level of the small cell in response to a determination that the expected frequency of handoff does not exceed a threshold value; and
   decrease the transmit power level of the small cell in response to a determination that the expected frequency of handoff exceeds the threshold value; and
   memory coupled to the at least one processor and configured to store related data and/or instructions,
   wherein the at least one transceiver is further configured to transmit a signal at the increased or decreased transmit power.

10. The apparatus of claim 9, wherein the small cell coverage area is identified by a pseudo-random noise sequence offset (PN offset), primary scrambling code (PSC), or physical cell identifier (PCI).

11. The apparatus of claim 9, wherein the small cell comprises a femto cell or pico cell base station not controlled by a macro cell base station controller.

12. The apparatus of claim 11, wherein the expected frequency of handoff is an expected frequency of handoff from the femto cell or pico cell base station to a macro cell base station controlled by the macro cell base station controller.

13. An apparatus for range tuning for open access small cells, comprising:
   at least one transceiver configured to:
      determining, at a small cell, one or more of the following:

a handoff success/failure rate among one or more mobile devices associated with the small cell; and a number of hand-ins and/or hand-outs among the one or more mobile devices associated with the small cell in a given time period;

at least one processor configured to:

determine an expected frequency of handoff for the small cell based on the determination;

increase a transmit power level of the small cell in response to a determination that the handoff success/failure rate or the number of hand-ins and/or hand-outs is below a threshold;

decrease the transmit power level of the small cell in response to a determination that the handoff success/failure rate or the number of hand-ins and/or hand-outs is above the threshold; and memory coupled to the at least one processor and configured to store related data and/or instructions;

wherein the at least one transceiver is further configured to transmit a signal at the increased or decreased transmit power.

14. The apparatus of claim 9, wherein the communication further include a mobile device velocity estimate, the mobile device velocity estimate being based at least in part on one or more position reports from the mobile device, one or more velocity reports from the mobile device, Doppler estimates associated with the mobile device, or a round trip delay measurement for communication with the mobile device.

15. The apparatus of claim 14, wherein the at least one processor is further configured to force a handoff of the mobile device to another access point when the mobile device velocity estimates indicate a high velocity for the mobile device.

16. The apparatus of claim 9, wherein controlling the transmit power level of the small cell is constrained by a maximum target limit and a minimum target limit derived from a transmission power or a measured received power of a neighboring macro cell.

17. An apparatus for range tuning for open access small cells, comprising:

means for receiving, at a small cell, a communication from a mobile device, the communication including one or more of the following:

a history of connection time durations of the mobile device with respect to at least one cell that is different from the small cell; and a registration associated with the mobile device;

means for determining an expected frequency of handoff for the mobile device around a small cell coverage area of the small cell based on the received communication;

means for increasing a transmit power level of the small cell in response to a determination that the expected frequency of handoff does not exceed a threshold value;

means for decreasing the transmit power level of the small cell in response to a determination that the expected frequency of handoff exceeds the threshold value; and means for transmitting a signal at the increased or decreased transmit power.

18. The apparatus of claim 17, wherein the small cell coverage area is identified by a pseudo-random noise sequence offset (PN offset), primary scrambling code (PSC), or physical cell identifier (PCI).

19. The apparatus of claim 17, wherein the small cell comprises a femto cell or pico cell base station not controlled by a macro cell base station controller.

20. The apparatus of claim 19, wherein the expected frequency of handoff is an expected frequency of handoff from the femto cell or pico cell base station to a macro cell base station controlled by the macro cell base station controller.

21. An apparatus for range tuning for open access small cells, comprising:

means for determining, at a small cell, one or more of the following:

a handoff success/failure rate among one or more mobile devices associated with the small cell; and a number of hand-ins and/or hand-outs among the one or more mobile devices associated with the small cell in a given time period;

means for determining an expected frequency of handoff for the small cell based on the determining;

means for increasing a transmit power level of the small cell in response to a determination that the handoff success/failure rate or the number of hand-ins and/or hand-outs is below a threshold;

means for decreasing the transmit power level of the small cell in response to a determination that the handoff success/failure rate or the number of hand-ins and/or hand-outs is above the threshold; and means for transmitting a signal at the increased or decreased transmit power.

22. The apparatus of claim 17, wherein the communication further include a mobile device velocity estimate, the mobile device velocity estimate being based at least in part on one or more position reports from the mobile device, one or more velocity reports from the mobile device, Doppler estimates associated with the mobile device, or a round trip delay measurement for communication with the mobile device.

23. The apparatus of claim 22, further comprising means for forcing a handoff of the mobile device to another access point when the mobile device velocity estimates indicate a high velocity for the mobile device.

24. The apparatus of claim 17, wherein controlling the transmit power level of the small cell is constrained by a maximum target limit and a minimum target limit derived from a transmission power or a measured received power of a neighboring macro cell.

25. A non-transitory computer-readable medium comprising code, which, when executed by at least one processor, causes the at least one processor to perform operations for range tuning for open access small cells, the non-transitory computer-readable medium comprising:

code for receiving, at a small cell, a communication from a mobile device, the communication including one or more of the following:

a history of connection time durations of the mobile device with respect to at least one cell that is different from the small cell; and a registration associated with the mobile device;

code for determining an expected frequency of handoff for the mobile device around a small cell coverage area of the small cell based on the received communication;

code for increasing a transmit power level of the small cell in response to a determination that the expected frequency of handoff does not exceed a threshold value;

code for decreasing the transmit power level of the small cell in response to a determination that the expected frequency of handoff exceeds the threshold value; and code for transmitting a signal at the increased or decreased transmit power.

26. The non-transitory computer-readable medium of claim 25, wherein the small cell coverage area is identified by a pseudo-random noise sequence offset (PN offset), primary scrambling code (PSC), or physical cell identifier (PCI).

27. The non-transitory computer-readable medium of claim 25, wherein the small cell comprises a femto cell or pico cell base station not controlled by a macro cell base station controller.

28. The non-transitory computer-readable medium of claim 27, wherein the expected frequency of handoff is an expected frequency of handoff from the femto cell or pico cell base station to a macro cell base station controlled by the macro cell base station controller.

29. A non-transitory computer-readable medium comprising code, which, when executed by at least one processor, causes the at least one processor to perform operations for range tuning for open access small cells, the non-transitory computer-readable medium comprising:
  code for determining, at a small cell, one or more of the following:
    a handoff success/failure rate among one or more mobile devices associated with the small cell; and
    a number of hand-ins and/or hand-outs among the one or more mobile devices associated with the small cell in a given time period;
  code for determining an expected frequency of handoff for the small cell based on the determining;
  code for increasing a transmit power level of the small cell in response to a determination that the handoff success/failure rate or the number of hand-ins and/or hand-outs is below a threshold;
  code for decreasing the transmit power level of the small cell in response to a determination that the handoff success/failure rate or the number of hand-ins and/or hand-outs is above the threshold; and
  code for transmitting a signal at the increased or decreased transmit power.

30. The non-transitory computer-readable medium of claim 25, wherein the communication further include a mobile device velocity estimate, the mobile device velocity estimate being based at least in part on one or more position reports from the mobile device, one or more velocity reports from the mobile device, Doppler estimates associated with the mobile device, or a round trip delay measurement for communication with the mobile device.

31. The non-transitory computer-readable medium of claim 30, further comprising code for forcing a handoff of the mobile device to another access point when the mobile device velocity estimates indicate a high velocity for the mobile device.

32. The non-transitory computer-readable medium of claim 25, wherein controlling the transmit power level of the small cell is constrained by a maximum target limit and a minimum target limit derived from a transmission power or a measured received power of a neighboring macro cell.

33. The method of claim 1, further comprising configuring the mobile device to perform periodic registration in accordance with a periodicity, wherein periodic registration information is received in accordance with the periodic registration by the mobile device.

34. The apparatus of claim 9, wherein the at least one processor is further configured to configure the mobile device to perform periodic registration in accordance with a periodicity, and wherein periodic registration information is received in accordance with the periodic registration by the mobile device.

35. The apparatus of claim 17, further comprising means for configuring the mobile device to perform periodic registration in accordance with a periodicity, wherein periodic registration information is received in accordance with the periodic registration by the mobile device.

36. The non-transitory computer-readable medium of claim 25, further comprising code for configuring the mobile device to perform periodic registration in accordance with a periodicity, wherein periodic registration information is received in accordance with the periodic registration by the mobile device.

37. The method of claim 33, further comprising setting the periodicity based on a duration threshold for adjusting the transmit power level of the small cell.

* * * * *